United States Patent [19]
Redmond, Sr.

[11] Patent Number: 5,645,013
[45] Date of Patent: Jul. 8, 1997

[54] PET LITTER BOX

[75] Inventor: H. Graham Redmond, Sr., Sunrise, Fla.

[73] Assignee: Redmond Innovations, Inc., Bayside, N.Y.

[21] Appl. No.: 626,442

[22] Filed: Apr. 2, 1996

[51] Int. Cl.⁶ ............................................. A01K 29/00
[52] U.S. Cl. ............................................. 119/170
[58] Field of Search ..................................... 119/165, 166, 119/167, 168, 170

[56] References Cited

U.S. PATENT DOCUMENTS 4,602,593  7/1986  Gross ........................... 119/166
4,616,598  10/1986  Burniski et al. ................ 119/166

FOREIGN PATENT DOCUMENTS 4200686  7/1993  Germany ......................... 119/166

Primary Examiner—Thomas Price
Attorney, Agent, or Firm—Walter Scott

[57] ABSTRACT

According to the present invention, fresh litter is placed in a first compartment. When the useful life to the litter expires, the litter is transferred to a second compartment which is lined with a disposable material. The second compartment is opened and the liner with the soiled litter is removed. A new liner is placed in the second compartment, which is then closed again, Thereafter, fresh litter is added to the first compartment and the litter box is ready for use.

17 Claims, 9 Drawing Sheets

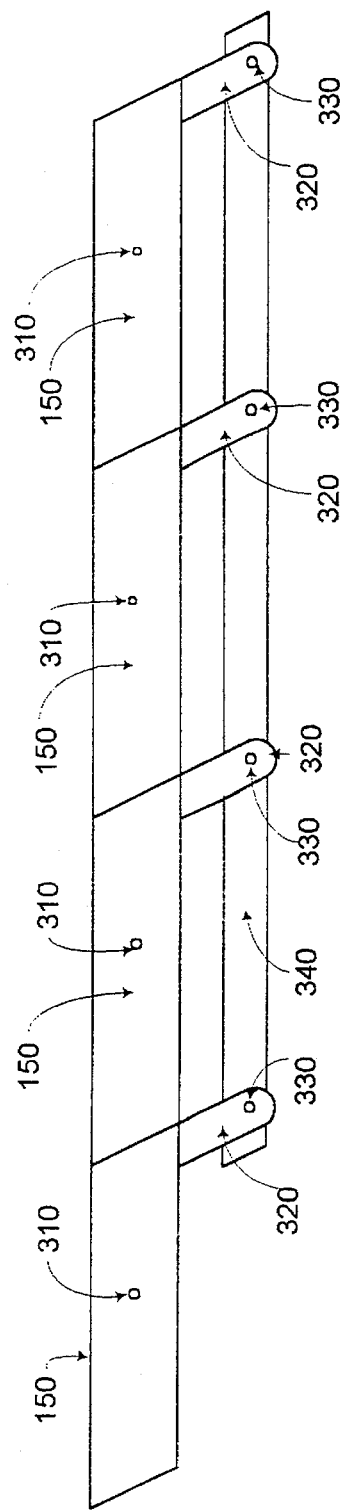
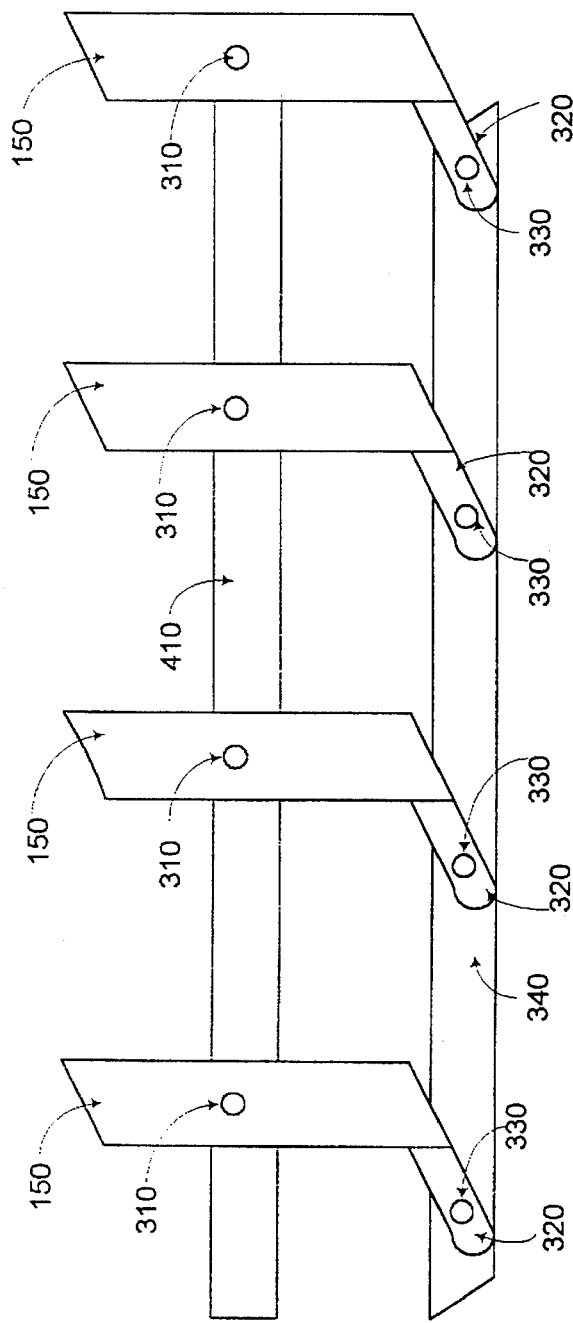

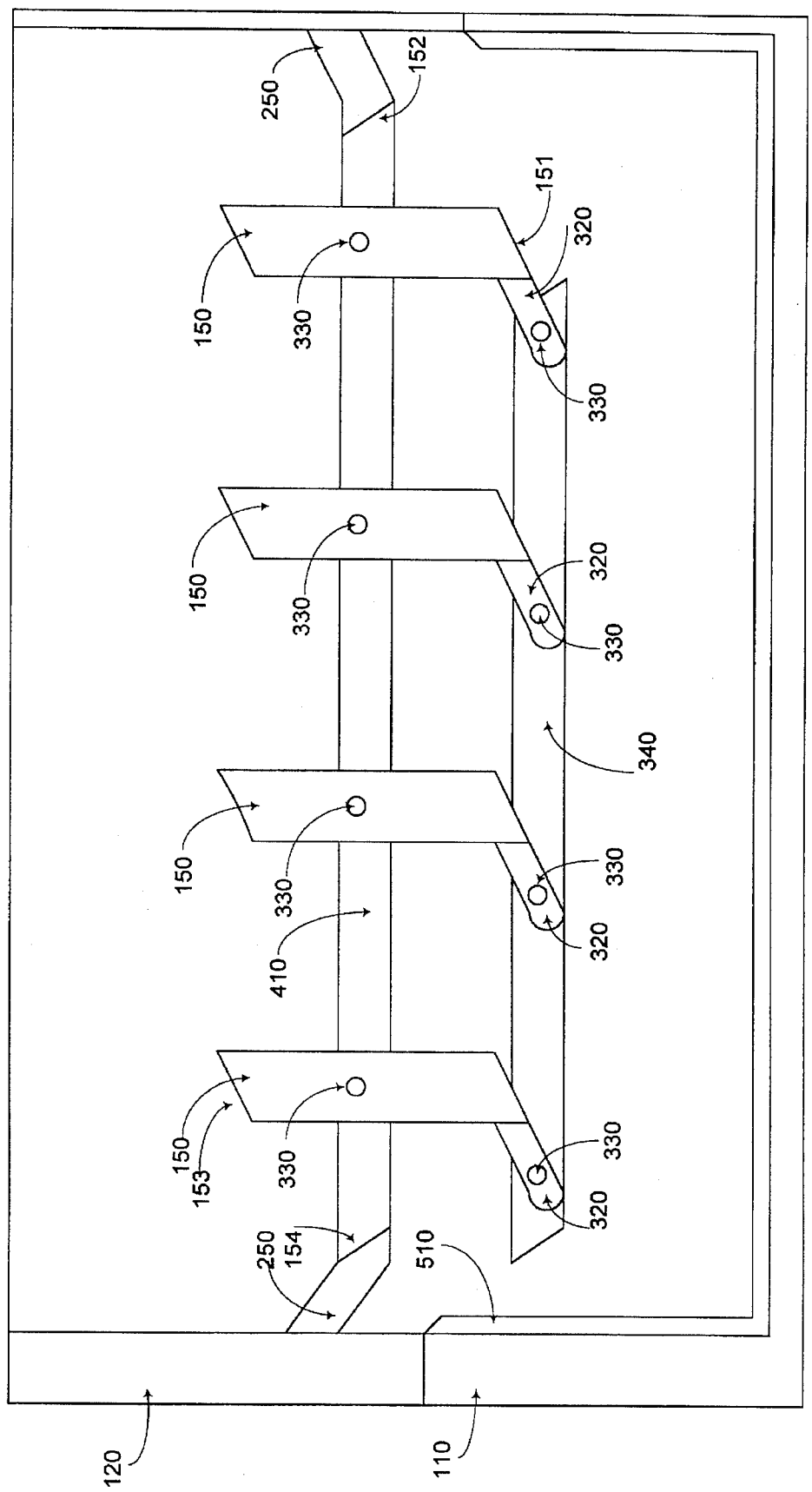

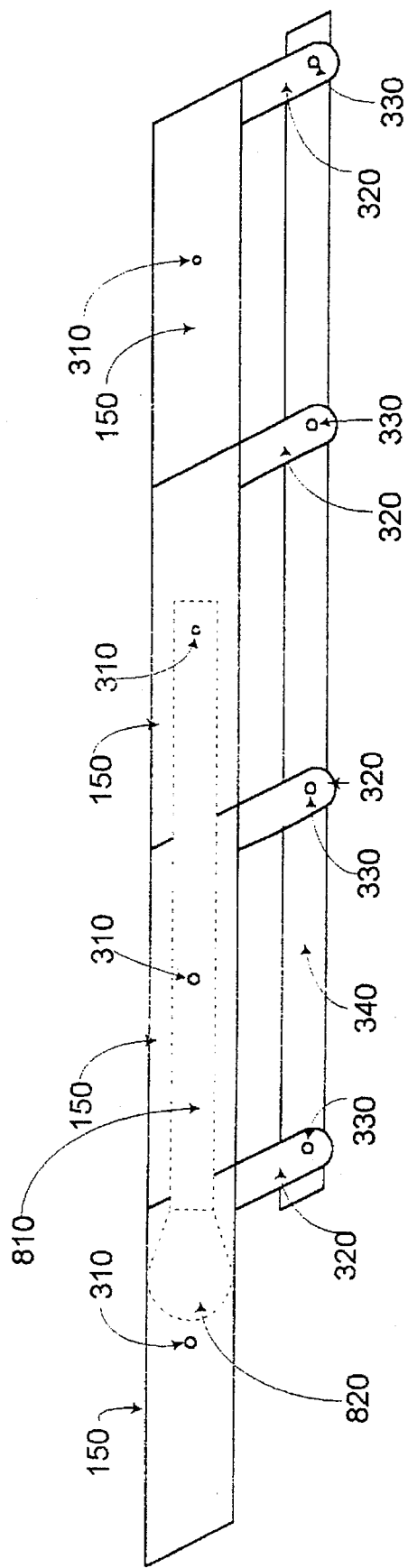

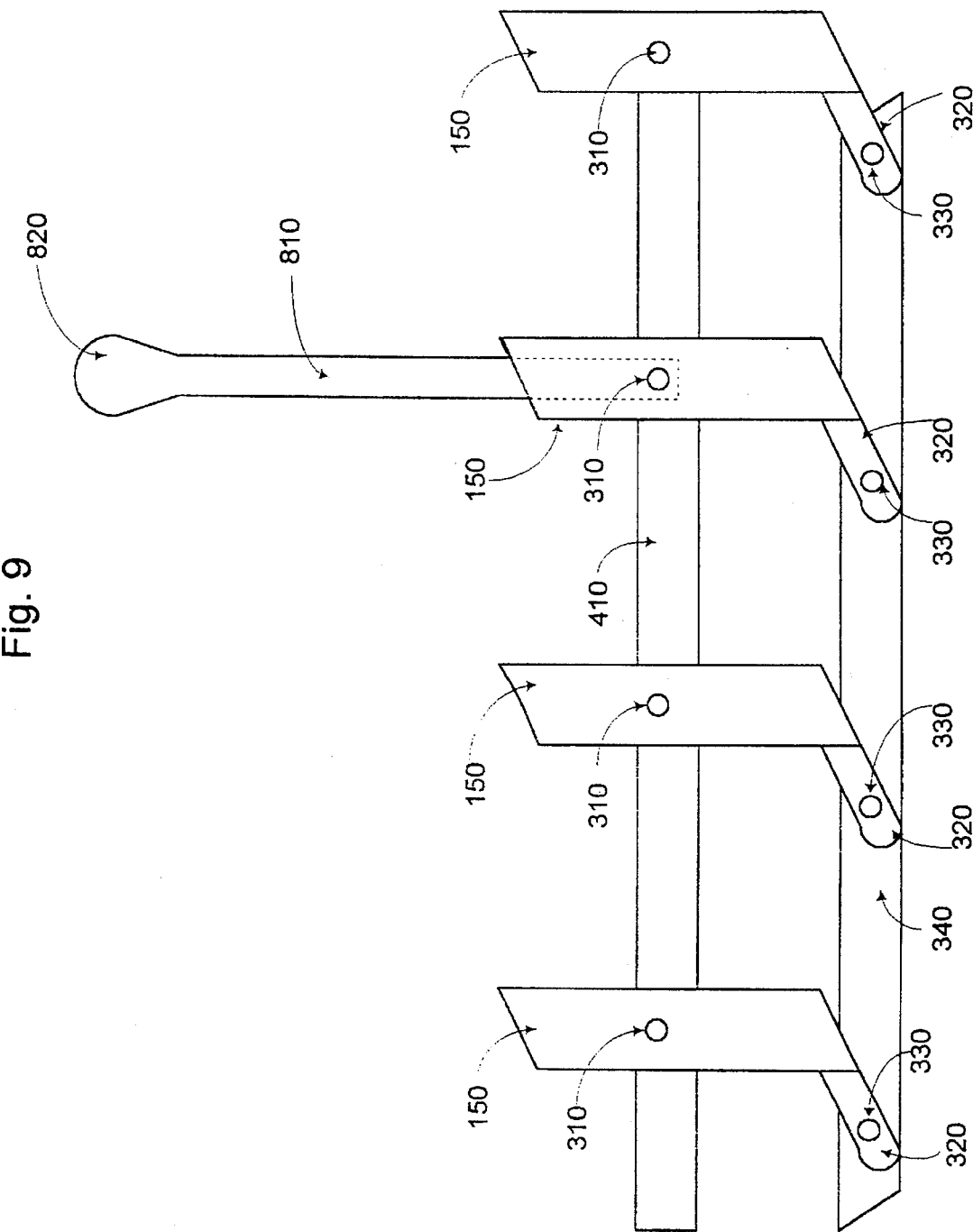

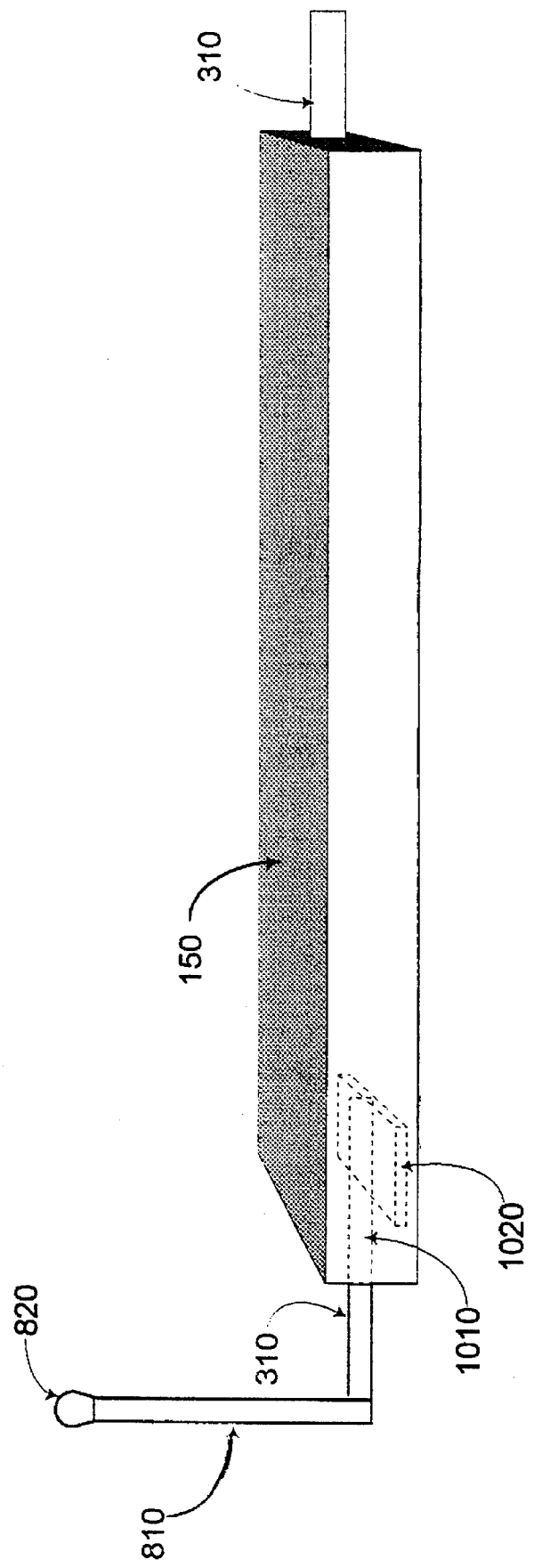

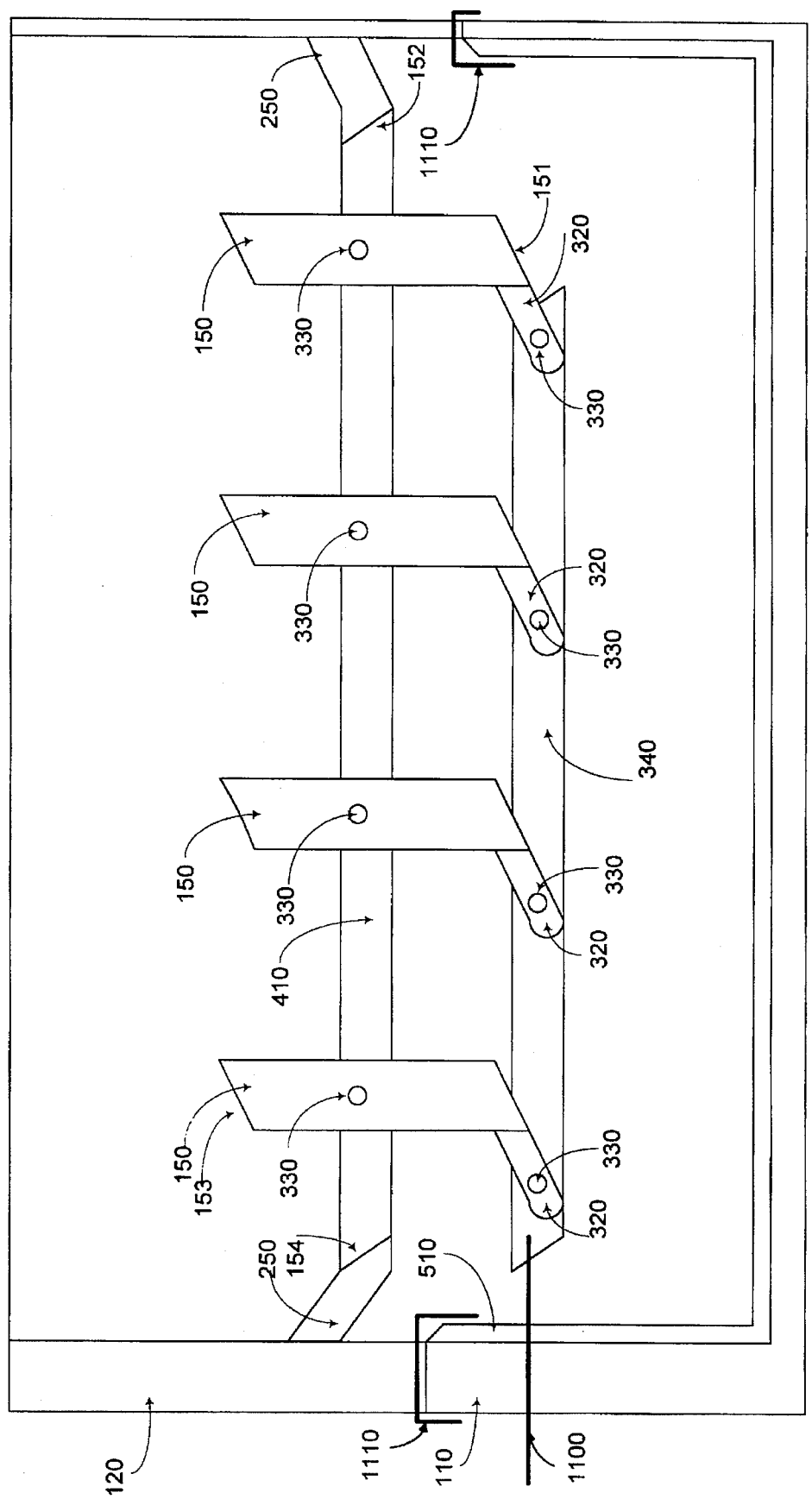

PET LITTER BOX

BACKGROUND OF THE INVENTION

This invention relates to pet relief stations which provide safe, sanitary management of pet excretions. More particularly, the present invention relates to devices for the collection and disposal of animal excrement, and still more particularly, the present invention pertains to a litter box which is adapted to allow simple and easy disposal of pet excrement from the litter box.

Many persons keep small pets, e.g., cats, hamsters or rabbits, as such pets are beneficial to their owners, especially elderly and children. However, management of pet excretions is important for the health and comfort of both the pet and for the people in contact with the pet. Pet excrement can harbor such diseases as toxoplasmosis and put the elderly and children at risk.

Cats, in particular, are fastidious about their personal hygiene and instinctively seek to cover up their excrement with loose soil or sand. To meet this need, cat owners generally provide their pets with litter boxes partially filled with specially manufactured granular or pelletized 'cat litter'. Most such commercially available pet litter is designed to absorb the fluid from animal wastes deposited therein, forming dry lumps of solid excrement and litter clumps held together by dried pet urine.

Nonetheless, one of the most unpleasant aspects of owning a cat as an indoor house pet is changing the cat litter box. Normally, cat litter is heaped in the bottom portion of a cat litter box, and the cat performs its excretory functions while standing on the cat litter. Within a short time period, noxious odors emanate from the litter box as a result of the ongoing putrefaction of the urine and excrement. To counteract this malodorous tendency of litter boxes, most cat owners purchase litter that is able to at least partly mask the odors. However, this masking ability significantly adds to the cost of the cat litter, and thus, the cost of keeping the cat.

In view of the cost of the litter, the owner usually attempts to periodically scoop out as much excrement as possible in order to extend effective life of the litter. The alternative of discarding all of the expensive litter is viewed as very uneconomical.

Various improvements on the basic animal litter box have been patented. Examples of these include: 'Self Cleaning Litter Box', U.S. Pat. No. 4,325,325 to Latter, comprising two identical rectangular containers with a perforated and somewhat shallower tray fittable between them to separate litter granules from dried waste and 'Pet Litter Separator', U.S. Pat. No. 4,325,822 to Miller, also having two identical containers that can have a perforated screen fitted between them to separate litter from waste.

Despite the ability of these litter boxes to extend the useful life of the litter, the litter is eventually saturated and still must be removed from the litter box. Thereafter, a new supply of litter is added to the box. None of the prior art devices simplifies the chore of cleaning of the litter box at that stage.

To make cleaning the litter box more palatable, many pet owners, initially at least, line their litter boxes with a plastic lining or bag. However, the pet's claws frequently dig through the litter, and snag and tear the plastic thereby negating the advantage of using the plastic. Eventually, most pet owners give up using a liner or bag, and clean the litter box each time new litter is added to the box.

Additionally, many of the litter box improvements are difficult for the disabled and elderly to operate, and these improvements frequently do not adequately provide for the liquid, acidic and odoriferous nature of pet urine.

A need, therefore, exists for simple and compact apparatus that permits easy removal of soiled pet litter.

SUMMARY OF THE INVENTION

According to the present invention, fresh litter is placed in a first compartment. When the useful life of the litter expires, the litter is transferred to a second compartment which is lined with a disposable material. The second compartment is opened and the liner with the soiled litter is removed. A new liner is placed in the second compartment, which is then closed again. Thereafter, fresh litter is added to the first compartment and the litter box is ready for use.

In a preferred embodiment, the first compartment sits on top of the second compartment. The two compartments are separated by a plurality of louvers, which when opened, permit the litter in the first compartment to fall into the second compartment.

BRIEF DESCRIPTION OF THE DRAWINGS

FIG. 3 is a cutaway side view of one embodiment of the false floor means that separates the first and the second compartments in the closed position;

FIG. 4 is a cutaway side view of the same embodiment of the false floor means that separates the first and the second compartments in the opened position;

FIG. 5 is an expanded cutaway side view of a refinement of that embodiment of the false floor means that separates the first and the second compartments in the opened position and illustrating the liner and the interaction of the end pieces with the false floor means;

FIG. 8 is a cutaway side view of an embodiment of the false floor means that separates the first and the second compartments in the closed position and includes a lever for opening and closing the false floor means;

FIG. 9 is a cutaway side view of the embodiment of the false floor means of FIG. 8 in the opened position;

FIG. 10 is a view of an embodiment of a louver of the embodiment of FIG. 8 including a lever for opening and closing the false floor means and a means for translating the motion of the lever into motion of the louver.

FIG. 11 is an expanded cutaway side view of a refinement of the embodiment of FIG. 5 showing a string or chain opening means and a clamp holding or retaining means.

DESCRIPTION OF THE PREFERRED EMBODIMENT

Figure 1:
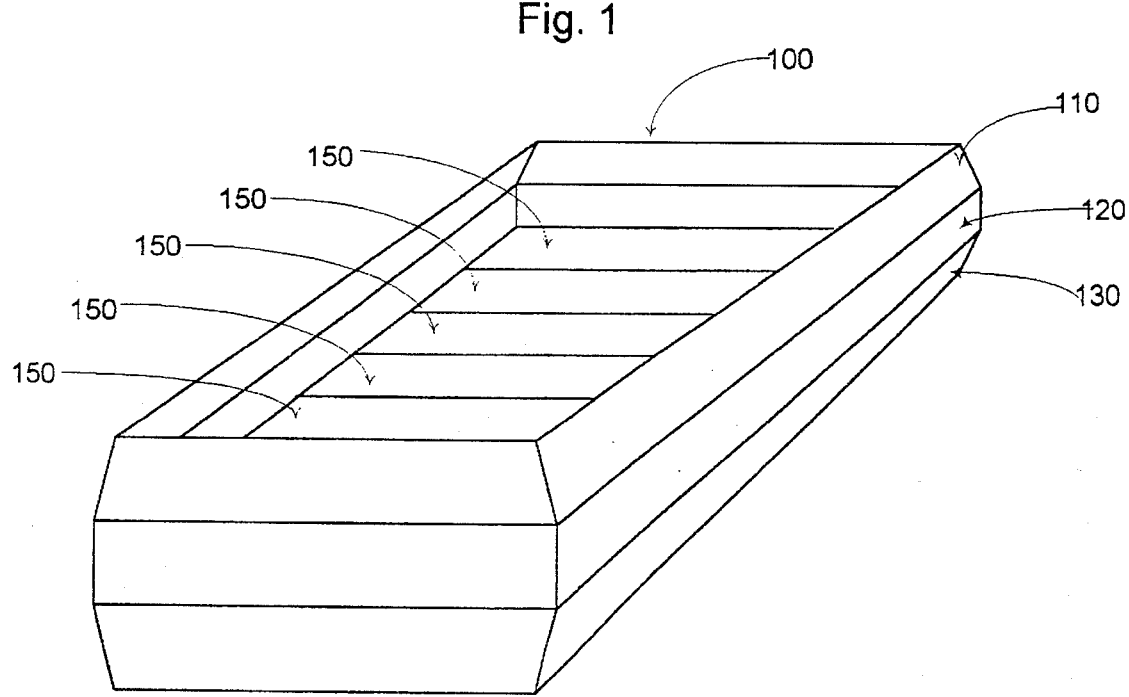
FIG. 1 is a prospective top view of a litter box according to the present invention.

The pet litter box of the present invention has a first and a second compartment. Desirably, the first compartment is located above the second compartment and the two compartments are separated by a means that is able to retain the litter and pet in the first compartment until it is desired to transfer the litter from the first compartment to the second compartment. At that desired time, the separating means is opened and the litter and pet waste is transferred to the second compartment.

The exterior of the first compartment of the present invention desirably resembles a conventional litter box. In any event, the first compartment must be readily accessible to the pet and simultaneously be able to support the appropriate amount of litter, as well as the pet. It is preferred that the first compartment permits the person operating the litter box, from time to time, to reach into the first compartment and to scoop out any solid or clumped liquid waste then in the litter box so as to extend the useful life of the litter. The removed litter and waste is disposed of in a conventional manner.

When the useful life to the litter does expire, the soiled litter, with the pet waste, is transferred to a second compartment which is lined with a disposable material. The second compartment is opened and the liner with the soiled litter is removed. In this way, the present invention permits one to remove the soiled litter easily, and with minimal contact with that litter.

Moreover, by placing the liner in a second compartment removed from the pet, the pet does not tear or otherwise damage the liner during the normal use of the litter. Notable, the box liner (bag) is not exposed to cat and the cat's instinctive tendency to scratch at the litter. As well known to pet owners, a liner bag that the pet can readily expose is soon torn rendering the bag unable to perform its function of retaining the litter. As a consequence of placing the liner in the second compartment according to the present invention, the previously ineffectual use of a plastic liner to facilitate cleaning of a litter box becomes useful. The stationary position of the bag should reduce microbial growth in the litter box.

Once the soiled litter is removed in the liner, a new liner is placed in the second compartment. The second compartment is then reclosed. Thereafter, fresh litter is added to the first compartment and the litter box is ready for use.

From time to time, it is advisable that both the first and the second compartment, as well as the separating means, are thoroughly cleaned. However, because of the removal of the litter in the liner, the frequency of such cleanings can be greatly reduced from say six or more times a month to say once a month without allowing an obnoxious odor or a health hazard to develop in the litter box.

In a preferred embodiment, the first compartment sits on top of the second compartment. The two compartments in a further preferred embodiment are separated by a plurality of louvers, which when opened, permit the litter in the first compartment to fall into the second compartment.

When the two compartments are separated by a plurality of louvers, the louvers can be opened (or closed) by any conventional means. For instance, a lever, cord or step peddle could be used to activate the means for rotating the louvers into an open position.

In an alternative embodiment, in which the first compartment sits on top of the second compartment, the two compartments are separated by a "roll top" floor that retracts into, or adjacent to, one of the walls of either the first or the second compartment.

Access to the second compartment can be in any of a number of conventional means. For instance, the first compartment and the separating means can be attached and this combination lifted off the second compartment to open it un. Alternatively, the first compartment and the separating means can be attached and hinged to the second compartment. The first compartment and separating means can then be swung out of the way to open the second compartment. In another embodiment of the means of opening the second compartment, the second compartment, or a portion thereof, can be drawer like and slide out for easy access.

As a result of the present invention, the pet owner does not come into direct contact with the excrement or soiled litter.

Desirably, any louvers fit snugly and there are no holes in either the first or second compartment, or the interface between the two compartments, that permit urine to leak to the exterior of the litter box, or from the first compartment to the second.

As a result of the present invention, final disposal of soiled pet litter is fast and easy.

FIG. 1 shows an elevational view of a pet litter box 100 according to a preferred embodiment of the present invention. The embodiment of FIG. 1 consists of a lower or second compartment, 130, which is covered by a plurality of rotatable louvers, 150, that form a floor above the second compartment 130. Mounted on top of the perimeter walls of the second compartment 130 is a first frame, or wall, 120, and in turn, on top of first frame 120 is a second frame, or wall, 110. The first frame 120 and the second frame 110 define the first compartment which holds the pet litter and is where the pet eliminates its waste.

The first and second compartments can be made from any conventional material including wood, plastic, fiberglass and metal. Moreover, these compartments can be made of either a single piece, or an assembly of pieces secured together in any conventional manner. In an alternative embodiment, second compartment 130 is removably mounted within a housing. For example, second compartment 130 can be mounted on a drawer slide mechanism within the housing and if the housing has an openable side, the second compartment 130 can be slid out and readily removed. The housing, in this alternative embodiment, supports both the first frame 120 and the second frame 110 (i.e., the first compartment).

Nonetheless, it is desired that air is only able to contact the soiled litter from the top of the litter as occurs in conventional litter boxes.

Typically, the lower or second compartment 130 is between about 1 inch ×3 inches ×1 inch and about 16 inches ×24 inches ×4 inches. Desirably, the lower compartment 130 is between about 2 inches ×4 inches ×1.5 inches and about 13.5 inches ×20 inches ×4 inches. As is apparent from the figures, the first and second frame dimensions are dependent upon the length and width of the second compartment (or in the alternative embodiment using a housing, on the housing). Desirably, the combined height of the first and second frames (i.e., the first compartment) is at least 7.5 inches and, in at least one area sufficient to provide the pet with egress to the litter box, not more than about 11.5 inches.

Collectively, the rotatable louvers 150 cover substantially all of the interior of the second compartment 130. Typically, rotatable louvers 150 are made of plastic, plastic coated metal, fiberglass or Teflon® and are between about 1 inch ×8 inches ×1/16 inch and about 3 inches ×16 inches ×1/4 inches. Desirably, the rotatable louvers 150 overlap on one side so as to provide a seal when the rotatable louvers 150 are in the closed position.

Figure 2:
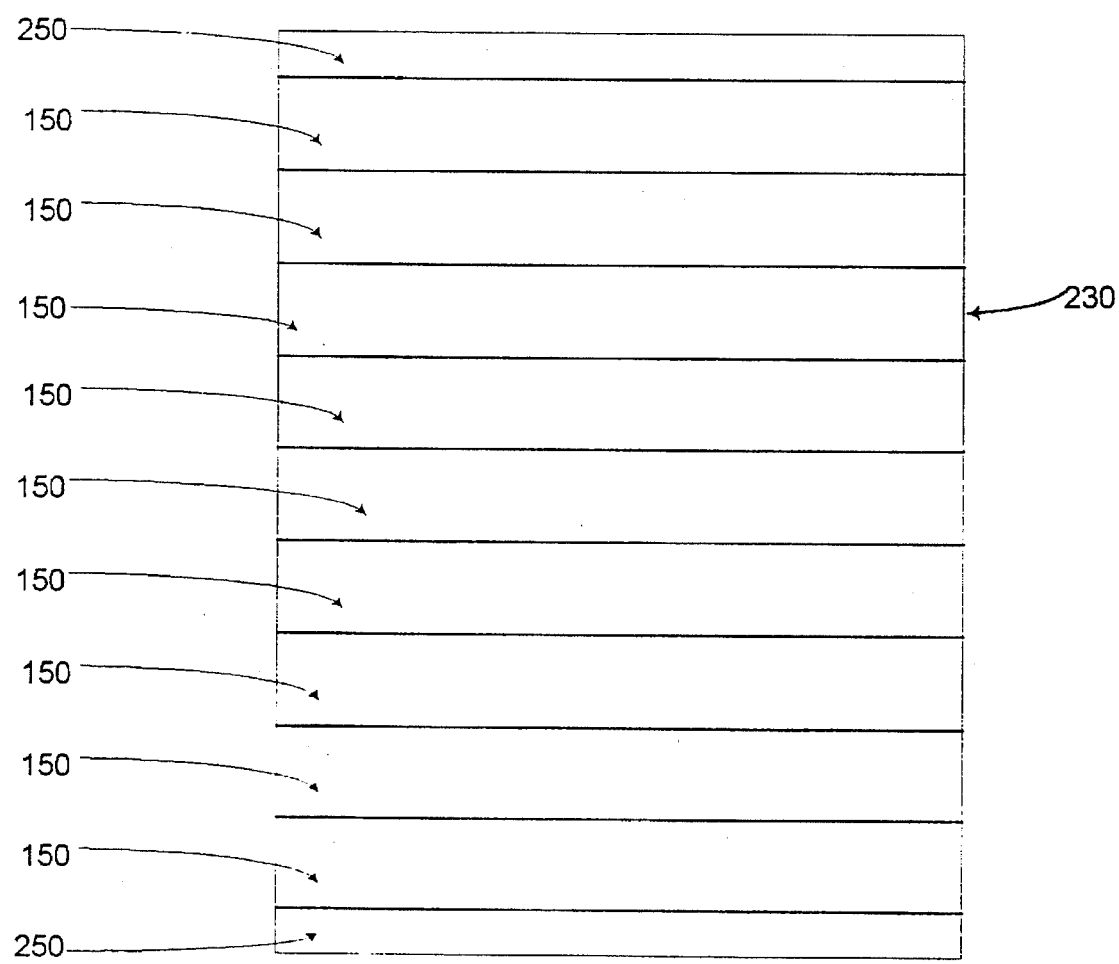
FIG. 2 is a top view of an embodiment of a false floor means useful in the practice of the present invention.

FIG. 2 shows a top view of the rotatable louvers 150 in an alternative embodiment that contains end pieces 250. In this alternative embodiment, the end pieces 250 have substantially the same length and thickness as the rotatable louvers 150, but typically, end pieces 250 are narrower than the rotatable louvers. In a preferred alternative embodiment, the end pieces are between 1/3 and 2/3s of the width of the rotatable louvers 150 when measured along the dimension 230. However, it is desirable that the end pieces 250 are mounted at an angle to the plane formed by the rotatable louvers 150 in the closed position. It is further desired that the end pieces 250 are mounted at an angle between about 15° and 75° from the plane formed by the rotatable louvers 150 in the closed position. It is still further desired that the end pieces 250 are mounted at an angle of between about 15° and about 60°. The end pieces can be made from any of the materials useful for the manufacture of the litter box.

It is further desired that each end piece and the louver abutting the end piece overlap and provide a seal when the louvers are in a closed position.

FIG. 3 shows a side view in the closed position of one embodiment of the rotatable louvers 150 including an embodiment of the present invention in which the rotatable louvers 150 overlap. In this embodiment, the rotatable louvers have a parallelogram cross-section that provides for an overlap of the rotatable louvers. It is further desired that one end piece 250 overlap the rotatable louver 150 adjacent to said end piece and that the rotatable louver 150 at the other end of the louvers overlaps the other end piece 250.

If any of the components of the litter box system are not inert to the combination of litter and pet waste, in either liquid or solid form, it is desired that the non-inert component (or components) is coated with a material effective to render the coated component inert to the litter and waste combination. In this regard, conventional coatings that are not harmful to the pets that will use the litter box may be used. In addition, it is also desired that any coatings used are acceptable to the pet that will use the box.

It is further desirable that the surfaces of the litter box that come in contact with the litter and pet waste readily separate from the litter and pet waste. For example, the surfaces of the litter box that come in contact with the litter and pet waste, e.g., the rotatable louvers 150, can be coated with Teflon® or some other non-stick material. Alternatively, or in addition, the surfaces that come in contact with the liter and pet waste may be coated with a conventional lubricant that will not harm any pet that comes in contact with the lubricant. When a lubricant is used, it is desirable that the lubricant is not perceived by the pet as repulsive. Thus, while vegetable oils are preferred lubricants, olive oil, or other strong smelling oils, should not be used as they are objectionable to many pets. It is further desired that any lubricant coating is applied as a thin coating such as that applied by spraying, for instance, a conventional home cooking oil spray onto the relevant surfaces.

Also shown in FIG. 3 is a mechanism for opening rotatable louvers 150. Each rotatable louver 150 has, on each end, a pin 310 to provide the mechanism for rotating the louvers. Additionally, each rotatable louver 150 has an arm 320, or in an alternative embodiment, two parallel arms 320. Desirably, the arm, or arms, 320 is (are) mounted on one side of the rotatable louver 150. Arms 320 are, in turn, attached to bar 340 by means of fasteners 330.

FIG. 4 shows the rotatable louvers 150 of FIG. 3 after bar 340 has been moved to the left. The motion of bar 340 in this embodiment moves arms 320, which in turn, rotate rotatable louvers 150 about pins 310 thereby opening the rotatable louvers 150. Bar 340 can be moved by any conventional means such as a lever, strings, chain or foot pedal.

Also shown in FIG. 4 is bar 410 into which the portion of pins 310 exterior to rotatable louvers 150 extend.

FIG. 5 shows a cut-away side view of a litter box according to a preferred embodiment of the present invention in which the rotatable louvers 150 are in the open position. In this embodiment, the rotatable louver 150 at the right extreme of the litter box has a surface 151 that, in the closed position, abuts the end piece 250 at the right extreme of the litter box at end piece surface 152. Rotatable louver surface 151 and end piece surface 152 are designed so that when the louvers are closed, these surfaces fit together to provide an overlap of end piece surface 152 over rotatable louver surface 151. This overlap forms a seal.

Similarly, at the left extreme of the litter box, rotatable louver surface 153, when the rotatable louvers are in the closed position, overlaps left end piece surface 154 and similarly forms a seal.

The position of liner 510 can also be seen in FIG. 5. It is desirable that the second compartment include a means for retaining the liner in place. Any conventional retaining means may be employed such as clips, spring clamps and grooves tailored to hold the liner in place.

Once the rotatable louvers 150 are rotated into the open position, the used pet litter and waste fall from the first compartment into the second compartment 110 and onto liner 510. When the second compartment 110 is opened, the used litter, lying on liner 510, can be readily removed by picking up the liner. A new liner is placed in the lower compartment and the litter box is reclosed and fresh litter is placed in the first compartment. The litter box is then ready for further use.

Figure 6:
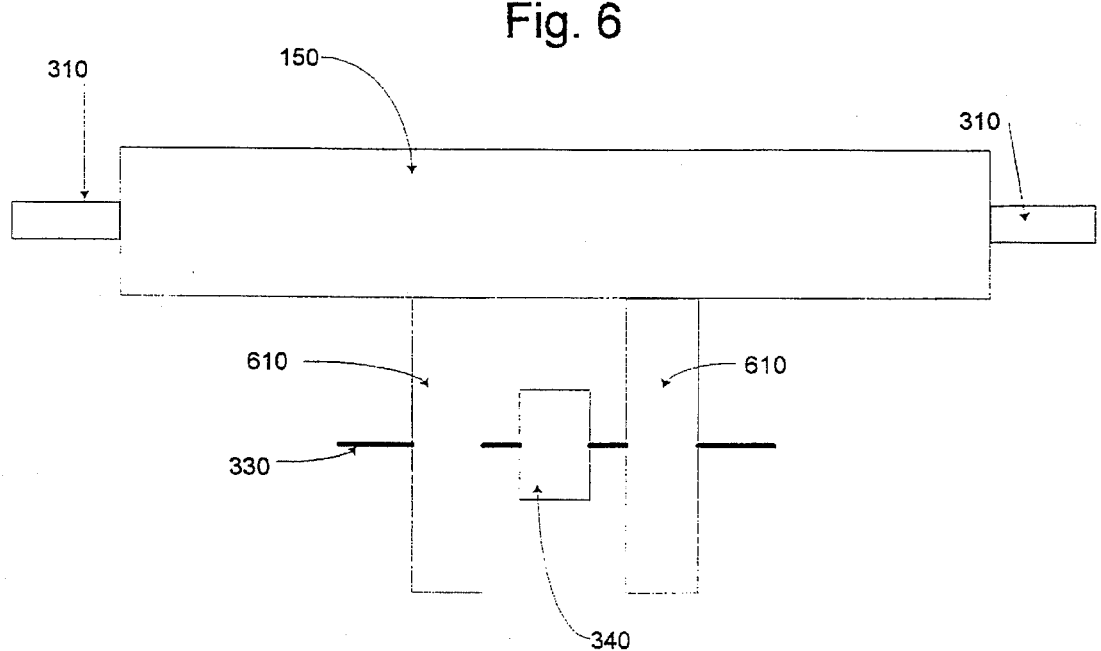
FIG. 6 is a side view of a two armed louver that is functional in the false floor means of the present invention.
Figure 7:
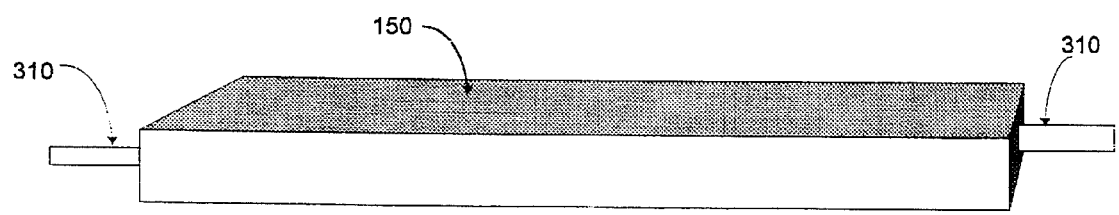
FIG. 7 is a top elevational view of a louver that is functional in the false floor means of the present invention.

FIG. 7 provides a prospective view of a rotatable louver 150 and FIG. 6 illustrates the use of two arms 610 to mount the bar 340 used in the above-described opening mechanism.

FIG. 8 shows the louvers 150 in the closed position and a lever 810 that, when rotated, moves said louvers into the open position. Also shown in this figure is a knob 820 on lever 810 that aids in the opening and closing of louvers 150 in this embodiment.

Lever 810 and knob 820 can be made of any conventional material. Moreover, while the figures show the position of louver 150 being parallel to that of lever 810, that parallelism is not necessary for the practice of the present invention. Rather, when louver 150 is in the closed position, lever 810 can be at any angle relative to the plane of the end of said louver. However, it is desired that when louver 150 is in the open position that lever 810 is moved to a position about 90° from the position lever 810 is in when louver 150 is in the closed position.

FIG. 9 illustrates the open position of lever 810 in the embodiment of FIG. 8.

FIG. 10 shows an extension 1010 of pin 310 in louver 150. Attached to extension 1010 is a plate 1020 that translates the motion of lever 810 into movement of louver 150. Plate 1020 can be made of any convention material and can be of any shape that permits the movement of lever 810 to be translated into movement of louver 150. In an alternative embodiment, pin 310 extension 1010 is shaped so that movement of extension 1010 is effective to move louver 150 to the desired position.

FIG. 11 shows a refinement of the cutaway side view of FIG. 5 showing the opening means 1100 and a linear holding or retaining means 1110.

As a consequence of the ease of changing the pet litter in the litter box of the present invention, one can easily change the litter more often and therefore use the less expensive, undeoderized litter without having intolerable smells emanate from the litter box. Specifically, by completely replacing the undeoderized litter about twice a week, the odor problem is controlled without the need for expensive deodorized litter.

What I claim is:

1. A pet litter box comprising:
   A. a first compartment;
   B. a false floor means at the bottom of said first compartment and a means of opening said false floor means operatively connected to said false floor means, said opening means effective to permit any material in said first compartment to pass through said opening means unimpeded; and
   C. a second compartment under said false floor means wherein said first and second compartments and an interface thereof are substantially free of holes through which urine can leak through to the exterior of said litter box, or from one compartment to the other, during normal use of said litter box.

2. The pet litter box of claim 1 further comprising a means for removing said second compartment from under said false floor means.

3. The pet litter box of claim 2 in which said means for opening said false floor comprises at least one member selected from the group consisting of a lever, string, chain, or a foot pedal.

4. The pet litter box of claim 3 in which the surfaces of said pet litter box that come in contact with the litter and pet excrement are coated with a non-stick material.

5. The pet litter box of claim 4 in which said second compartment further comprises a means of retaining said lining.

6. The pet litter box of claim 1 in which said false floor means comprises a plurality of louvers.

7. The pet litter box of claim 6 in which said louvers overlap in a manner effective to form a seal.

8. The pet litter box of claim 7 in which said first compartment further comprises an end piece and one of said louvers overlaps said end piece in a manner effective to form a seal.

9. The pet litter box of claim 8 in which said end piece is at an angle rising upward from the plain of the louvers to an end of the litter box.

10. The pet litter box of claim 1 in which said false floor means comprises a floor that is capable of being retracted into one wall of said litter box.

11. The pet litter box of claim 1 in which said false floor means comprises a floor that is capable of being retracted adjacent to one wall of said litter box.

12. The pet litter box of claim 11 in which said second compartment further comprises a lining.

13. The pet litter box of claim 12 in which said first compartment further comprises an end piece.

14. A method of changing the litter in a pet litter box comprising:
   A. opening a passage between a first compartment containing soiled litter and a second compartment containing a liner and thereby transferring said soiled litter from said first compartment to said liner in said second compartment;
   B. opening said second compartment and removing said liner and litter combination;
   C. reclosing said second compartment and adding fresh pet litter to said first compartment.

15. The method of claim 14 further comprising coating at least one surface of said litter box with a spray oil.

16. A pet litter box comprising:
   A. a first compartment;
   B. a floor of said first compartment comprising a plurality of louvers;
   C. a means of opening said plurality of louvers; and
   D. a second compartment which sits below said first compartment and when said louvers are in the open position, said second compartment is in communication with said first compartment.

17. The pet litter box of claim 16 in which said second compartment further comprises a means of holding a liner in place.

* * * * *